United States Patent [19]

Yamaguchi et al.

[11] Patent Number: 4,544,053
[45] Date of Patent: Oct. 1, 1985

[54] TEMPERATURE-RESPONSIVE FLUID COUPLING DEVICE

[75] Inventors: Hiroji Yamaguchi, Kariya; Masaharu Hayashi; Masato Itakura, both of Toyota, all of Japan

[73] Assignee: Aisin Seiki Kabushiki Kaisha, Kariya, Japan

[21] Appl. No.: 511,937

[22] Filed: Jul. 8, 1983

[30] Foreign Application Priority Data

Jul. 12, 1982 [JP] Japan ............................ 57-120820

[51] Int. Cl.$^4$ ............................................. F16D 31/00
[52] U.S. Cl. ............................... 192/58 B; 192/82 T
[58] Field of Search ........................... 192/58 B, 82 T

[56] References Cited

U.S. PATENT DOCUMENTS

| | | | |
|---|---|---|---|
| 3,259,220 | 7/1966 | Roper | 192/58 B |
| 4,271,946 | 6/1981 | Bridge | 192/58 B |
| 4,312,433 | 1/1982 | Bopp | 192/58 B |
| 4,485,902 | 12/1984 | Storz | 192/58 B |

FOREIGN PATENT DOCUMENTS 2099960  12/1982  United Kingdom ............. 192/58 B Primary Examiner—Stephen F. Husar
Attorney, Agent, or Firm—Oblon, Fisher, Spivak, McClelland & Maier

[57] ABSTRACT

A temperature-responsive fluid coupling device for driving a cooling fan of an internal combustion engine includes a ball check valve mechanism which is installed in a fluid return passage and a pumping passage, respectively. The valve mechanism comprises a ball check valve positioned in a slidable state in a radial direction, a spring biasing the check valve toward a closed position thereof, and a cap member supporting the spring and limiting a distance of a sliding movement of the check valve.

6 Claims, 4 Drawing Figures

TEMPERATURE-RESPONSIVE FLUID COUPLING DEVICE

BACKGROUND OF THE INVENTION

1. Field of the Invention

This invention relates to temperature-responsive fluid coupling devices in general, and more particularly to a temperature-responsive fluid coupling device used for a cooling fan of an internal combustion engine.

2. Prior Art of the Invention

There has been introduced a temperature-responsive fluid coupling device which includes a driving shaft driven by an engine, a housing mounted on the shaft in a rotatable state by a suitable bearing, a rotor connected with the shaft, a partition plate dividing an interior of the housing into a reservoir chamber for a viscous shear fluid and a working chamber accommodating the rotor, a fluid return passage formed through the partition plate to return the viscous fluid from the reservoir chamber to the working chamber, a valve plate controlling the fluid communication through the fluid return passage in response to changes in the temperatures of cooling water in an engine radiator, and a pumping passage supplying the viscous fluid from the working chamber to the reservoir chamber, thereby rotating a cooling fan connected to the housing by means of the shear action of the viscous fluid prevailed between the rotor and the housing.

Conventionally, according to a fluid coupling device of this type, if an ignition switch is turned off, the viscous fluid will stand in the bottom of the housing and the fluid will remain in the working chamber. Therefore, if the engine is started again for example in the morning, the cooling fan will be rotated in a state which is almost a direct connection until the viscous fluid has been transferred from the working chamber to the reservoir chamber through the pumping passage, that is to say, an overshoot phenomenon will occur. Consequently, it takes a great deal of time to heat the engine, and also it takes time to heat the interior of a car room.

SUMMARY OF THE INVENTION

An object of the present invention is to eliminate the disadvantages of prior art temperature-responsive fluid coupling devices.

More particularly, it is an object of the present invention to provide a new and improved temperature-responsive fluid coupling device wherein the viscous fluid is transferred from the working chamber at the time rotational speed of the engine decreases below an idling speed, and the viscous fluid is prevented from being transferred from the reservoir chamber to the working chamber at the time the engine is brought to a stop.

Another object of the present invention is to provide a new and improved temperature-responsive fluid coupling device, utilizing comparatively simple mechanical components, which is economical to manufacture and thoroughly reliable in operation.

In one illustrative embodiment of the present invention, there is provided a temperature-responsive fluid coupling device which includes check valve mechanisms installed in a fluid return passage and a pumping passage, respectively. The check valve mechanism comprises a ball check valve positioned in a radial direction, a spring biasing the check valve toward a closed position thereof, and a cap member supporting the spring and limiting a distance of a sliding movement of the ball check valve. The load of the spring is so established such that the fluid return passage may be brought in its closed state at the moment the engine speed decreases below an idling speed in a stopping process of the engine, and that the pumping passage may be brought in its closed state in a short time after.

In accordance with one feature of the present invention, since a pumping operation continues for a while after the oil return passage is closed, the working chamber in a stopping state of the engine will contain small amount of fluid as compared with that in an idling state of the engine. When the engine is brought to a stop, both the pumping passage and the oil return passage are maintained in its closed state respectively, thereby intercepting completely the communication between the reservoir chamber and the working chamber. Accordingly, if the engine is brought to a stop in a OFF-state of the fluid coupling device, the coupling device will start in the OFF-state at the start of the engine. Even if the engine is brought to a stop in a ON-state of the coupling device, the coupling device will be able to start in the OFF-state in the same manner at the start of the engine.

In accordance with another feature of the present invention, the cap member which supports the spring biasing the ball check valve has at the same time the function to limit the sliding movement of the ball check valve, thereby preventing the spring from buckling and improving the operational performance of the check valve mechanism.

In accordance with a further feature of the invention, the ball check valve is positioned so that the sliding friction of the ball check valve may become as small as possible when the ball check valve slides in a radial direction, thereby preventing errors in the operations of the ball check valve due to the frictional resistance.

Other objects, features and advantages of the invention will become more apparent upon reference to the succeeding detailed description thereof, and to the drawings illustrating preferred embodiments thereof.

DETAILED DESCRIPTION OF THE PREFERRED EMBODIMENTS OF THE INVENTION

Figure 1:
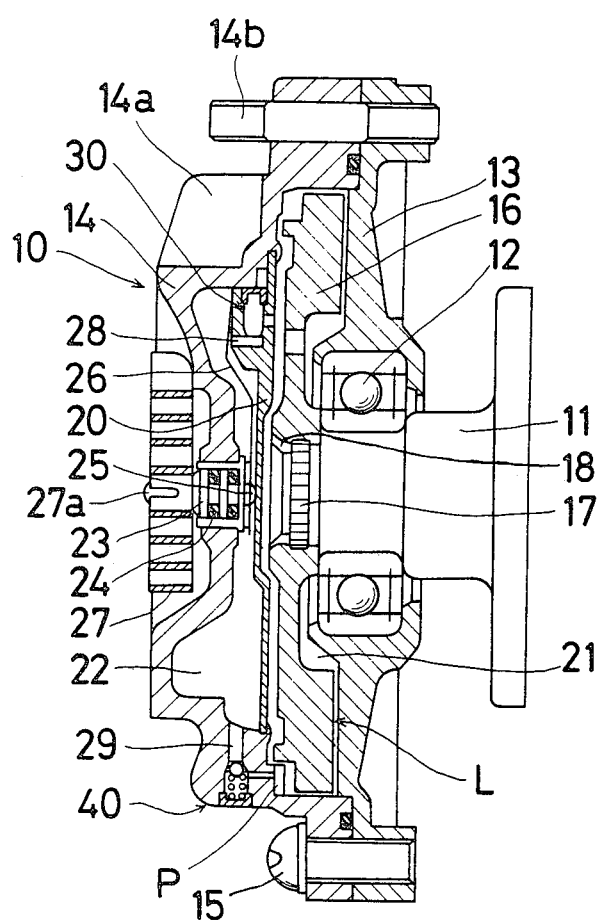
FIG. 1 is an axial sectional view of a temperature-responsive fluid coupling device embodying the present invention.

Referring now to FIG. 1 showing a temperature-responsive fluid coupling device 10, a driving shaft 11 is driven so as to be rotated by an engine. A casing member 13 is rotatably mounted on the driving shaft 11 by a suitable bearing 12. A cover member 14 is secured to the casing member 13 by means of bolts 15. Both the casing member 13 and the cover member 14 form a housing, of the fluid coupling device 10, having a hollow interior in which a rotor 16 is accommodated. A center portion of the rotor is connected with the shaft 11 by a spring connection 18 and then is secured to the shaft 11 by a calking means, whereby the rotor 16 can rotate with the shaft 11 as a body. Adjacent surface portions of the rotor 16 and the casing member 13 are provided with torque transmitting elements comprising a plurality of cooperating grooves and lands which form generally a labyrinth L in FIG. 1. These grooves and lands provide opposed surfaces extending in close parallel face to face relation and have an prevailing shear space therebetween. Upon rotation of the rotor 16, the rotational force of the rotor 16 is transmitted to the casing member 13 by the shear action of the fluid in the labyrinth L.

Secured to an inside of the cover member 14 is a partition plate 20, in the form of a disk, which divides a hollow interior of the cover member 14 into a working chamber 21 accommodating the rotor 16 therein and a reservoir chamber 22 for a viscous fluid such as a silicone oil. The cover member 14 is provided on the outer surface thereof with a plurality of fins 14a for dissipating the heat produced by the transmission of torque between the rotor 16 and the casing member 13. Furthermore, the cover member 14 is provided with a screw means 14b so as to secure the cooling fan, not shown, to the cover member 14. A shaft 23 is rotatably supported by the center of the cover member 14. O-rings 24 are disposed on the outer surface of the shaft 23 for preventing the escape of the fluid from the reservoir chamber 22 by leaking along and around the shaft 23. A valve plate 26 is connected to the rightward end of the shaft 23 by means of a bolt 25, whereby the valve plate 26 can rotate with the shaft on the partition plate 20.

A bimetal spiral spring member 27 is mounted on the front side surface of the cover member 14. An inner end 27a of the bimetal spring 27 is secured to the leftward end of the shaft 23, while the outer end of the bimetal spring 27 is secured to the cover member 14. The bimetal spring 27 is located in an exposed position on the front side of the cover member 14 so as to be contacted by the stream of heated air from the radiator of the internal combustion engine. The bimetal spring 27 will accordingly be subjected to changes in temperatures of the radiator air and will be changed correspondingly. When the bimetal spring 27 is subjected to a temperature increase, the valve plate 26 will be rotated in one direction through means of the shaft 23 which is caused to be rotated by the bimetal spring 27. When the bimetal spring 27 is subjected to a temperature decrease, the valve plate 26 will be rotated in the opposite direction through means of the shaft 23.

The partition plate 20 is provided at the outer circumferential portion thereof with a fluid return passage or hole 28 through which the viscous fluid is permitted to flow from the reservoir chamber 22 to the working chamber 21. On the other hand, the cover member 14 is provided with a pumping passage or hole 29 through which the viscous fluid can be transferred from the working chamber 21 to the reservoir chamber 22.

Figure 2:
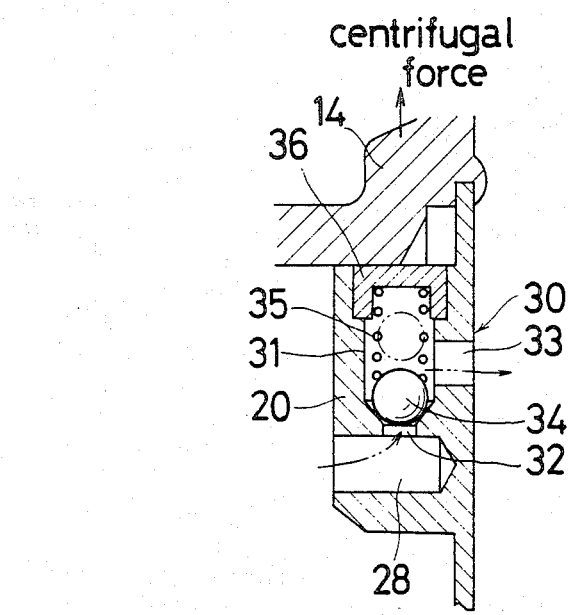
FIG. 2 is an enlarged sectional view of an oil return passage shown in FIG. 1.
Figure 3:
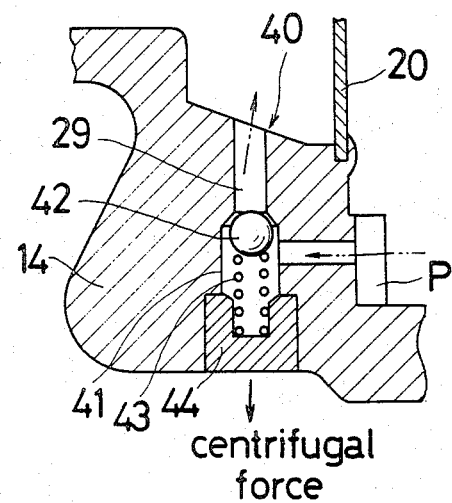
FIG. 3 is an enlarged sectional view of a pumping passage shown in FIG. 1.

As shown in FIG. 2 and FIG. 3, ball check valve mechanisms 30 and 40 are installed in the fluid return passage 28 and in the pumping passage 29, respectively. FIG. 2 shows the ball check valve mechanism 30 installed in the fluid return passage 28. The partition plate 20 is provided with a cylinder 31 which is connected with the fluid return passage 28 through a communicating port 32 and at the same time is connected with the working chamber 21 through a communicating port 33. A ball check valve 34 is located in the cylinder 31 in a slidable state in a radial direction, thereby permitting the viscous fluid to flow only in the direction from the reservoir chamber 22 to the working chamber 21. Since the cylinder 31 forming a guiding portion for the ball check valve 34 has a relatively larger diameter than the ball check valve 34, there will be a poor contact between the cylinder 31 and the ball check valve 34 when the ball check valve slides in the cylinder 31, thereby lessening the sliding frictional resistance of the ball check valve 34 and preventing the occurrences of errors in operations of the ball check valve 34.

The ball check valve 34 is constantly biased toward its closed position by a spring 35 located in the cylinder 31. A cap member 36 supporting the spring 35 has an inside diameter so that there may be a small clearance between the inside diameter of the cap member 36 and the outside diameter of the spring 35. Furthermore, since the inside diameter of the cap member 36 is smaller than the diameter of the ball check valve 34, it may be possible to limit a distance of a sliding movement of the ball check valve 34 and to prevent the spring 35 from buckling. When the cover member 14 rotates with the driving shaft 11, a centrifugal force will be exerted on the ball check valve 34 in a radial outward direction, namely an upward direction in FIG. 2. The ball check valve 34 is driven to move upwardly in the drawing against the biasing force of the spring 35, thereby maintaining the ball check valve 34 in its opened position.

On the other hand, referring to FIG. 3 indicating the ball check valve mechanism 40 installed in the pumping passage 29, the cover member 14 is provided with a cylinder through which the viscous fluid in the working chamber 21 is transferred from the pumping passage 29 to the reservoir chamber 22 by means of a discharge action of the pumping projection P. A ball check valve 42 is located in the cylinder 41 in parallel with the partition plate 20 in a slidable state in a radial direction, thereby permitting the viscous fluid to flow only in the direction from the working chamber 21 to the reservoir chamber 22. Since the cylinder 41 forming a guiding portion for the ball check valve 42 has a relatively larger diameter than the ball check valve 42, there will be a poor contact between the cylinder 41 and the ball check valve 42 when the ball check valve 42 slides in the cylinder 41, thereby lessening the sliding frictional resistance of the ball check valve 42 and preventing the occurrences of errors in operations of the ball check valve 42.

The ball check valve 42 is constantly biased toward its closed position by a spring 43 located in the cylinder 41. A cap member 44 supporting the spring 43 has an inside dimeter so that there may be a small clearance between the inside diameter of the cap member 44 and the ouside diameter of the spring 43. Furthermore, since the inside diameter of the cap member 44 is smaller than the diameter of the ball check valve 42, it may be possible to limit a distance of a sliding movement of the ball check valve 42 and to prevent the spring 43 from buckling. When the cover member 14 rotates with the driving shaft 11, a centrifugal force will be exerted on the ball check valve 42 in a radial outward direction, namely a downward direction in FIG. 3. The ball check valve 42 is driven to move downwardly in the drawing against the biasing force of the spring 43, thereby maintaining the ball check valve 42 in its opened position.

Figure 4:
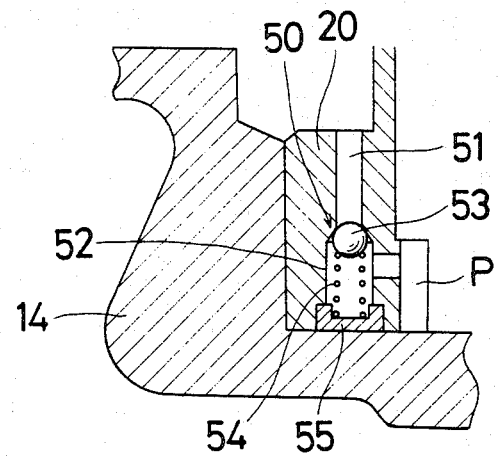
FIG. 4 is an enlarged sectional view of a modified form of the pumping passage shown in FIG. 3.

Referring next to FIG. 4 showing a modified form of the mechanism 40 in FIG. 3, the partition plate 20 is provided with a pumping passage 51 in which a ball check valve mechanism 50 is installed. The mechanism 50 includes a ball check valve 53 sliding in a cylinder 52, a spring 54 constantly biasing the ball check valve 53 toward its closed position, and a cap member 55 supporting the spring 54.

The loads of the springs 35,43 of the check valve mechanism 30,40 are so established such that in the process of the stop of the engine at first the fluid return passage 28 may be brought and maintained in its closed state and next the pumping passage 29 may be brought and maintained in its closed state.

In operation of the coupling device 10 according to the present invention, when the ignition switch is turned on to start the engine, the rotor 16 will rotate with the driving shaft 11 as a body by the driving force of the engine. Since a small quantity of fluid remains in the working chamber 21, the fluid will prevail in the labyrinth L and then the torque of the rotor 16 will be transmitted to the casing member 13 and cover member 14 by the shear action of the fluid in the labyrinth L. Owing to a small quantity of fluid in the working chamber 21, the driven members namely the casing member 13 and the cover member 14 have very small rotational speeds, respectively, as compared with that of the rotor 16. Since the load of the spring 35 is established to be small, however, the ball check valve 34 will be moved in a radial outward direction against the biasing force of the spring 35 by the centrifugal force during the rotation of the cover member 14, thereby maintaining the ball check valve 34 in its opened state.

On the other hand, when a predetermined time elapses after the start of the engine, a cooling water temperature of the radiator will rise and then the bimetal 27 will actuate the valve plate 26 to cause it to rotate, whereby the reservoir chamber 22 can communicate with the working chamber 21 through the fluid return passage 28. Accordingly, owing to an increase in the amount of the fluid prevailing in the labyrinth L, the torque of the rotor 16 functioning as a power driving member is transmitted as a large force to the casing and cover members 13,14 and the partition plate 20 functioning as power driven members. As a result, the rotational speeds of the power driven members will increase in proportion to the increased amount of the fluid flowing into the working chamber 21.

At the same time, the ball check valve 42 located in the pumping passage 29 is moved in a radial outward direction against the biasing force of the spring 43 by the centrifugal force during the rotation of the cover member 14, thereby maintaining the ball check valve 42 in its opened state. Therefore, the viscous fluid in the working chamber 21 is transferred from the pumping passage 29 to the reservoir chamber 22 by means of discharge action of the pumping projection P. As a result, the amount of the fluid in the working chamber 21 will be kept constant.

When the ignition switch is turned off to bring the engine to a stop, the centrifugal force produced by the rotation of the cover member 14 will become small, whereby at first the fluid return passage 28 is closed by the ball check valve 34 and next in a short time thereafter the pumping passage 29 is closed by the ball check valve 42. Accordingly, when the ball valve 34 is maintained in its closed state, the viscous fluid will be prevented from flowing from the reservoir chamber 22 to the working chamber 21. On the other hand, since the ball check valve 42 is maintained in its opened position for a while and then the pumping operation continues through the pumping passage 29, a small amount of the fluid will remain in the working chamber 21 at the stopping time of the engine. When the engine is brought to a stop, both the fluid return passage 28 and the pumping passage 29 will be maintained in a closed state, respectively, thereby intercepting completely the communication between the reservoir chamber 22 and the working chamber 21. Thus, when the rotational speed of the engine decreases below an idling rotational speed in the stopping process of the engine, the viscous fluid in the working chamber 21 will be transferred to the reservoir chamber 22. After the stop of the engine the viscous fluid will be prevented from returning to the working chamber 21. Therefore, it may be possible to prevent the overshoot phenomenon which conventionally occurs at the start of the engine.

While preferred embodiments of the invention have been described, it will be readily apparent to those skilled in the art that various changes and arrangements can be made to accomplish the objects of the invention without departing from the scope and spirit of the appended claims.

What is claimed is:

1. A temperature-responsive fluid coupling device for driving a cooling fan of an internal combustion engine, said coupling device comprising:

a driving shaft driven so as to be rotated by said engine;

a housing member rotatably mounted on said driving shaft;

a rotor located in a hollow interior of said housing and connected with said driving shaft;

a partition plate dividing said hollow interior into a reservoir chamber for a viscous fluid and a working chamber accommodating said rotor therein;

a fluid return passage formed in said partition plate to cause said viscous fluid to return from said reservoir chamber to said working chamber;

a valve plate rotating on said partition plate in response to changes in temperatures of a cooling water in an engine radiator so as to control a fluid communication through said fluid return passage;

a pumping passage formed in said housing to transfer said viscous fluid from said working chamber to said reservoir chamber; and a ball check valve mechanism installed in said fluid return passage and said pumping passage, respectively;

said valve mechanism including a ball check valve located in a slidable state in a radial direction, a spring biasing said ball check valve toward its closed position, and a cap member supporting said spring and limiting a distance of a sliding movement of said ball check valve;

said spring having a load which is so established such that in a stopping process of said engine at first said fluid return passage is brought and maintained in its closed state and next said pumping passage is brought and maintained in its closed state respectively.

2. A temperature-responsive fluid coupling device accoding to claim 1 wherein said pumping passage is formed in said partition plate.

3. A temperature-responsive fluid coupling device according to claim 1 wherein said ball check valve mechanism further includes a cylinder forming a guide portion for said ball check valve.

4. A temperature-responsive fluid coupling device according to claim 3 wherein said cylinder has a relatively larger diametric length than said ball check valve.

5. A temperature-responsive fluid coupling device according to claim 1 wherein said cap member has an inside diameter so that there may be a small clearance between said cap member and said spring.

6. A temperature-responsive fluid coupling device according to claim 5 wherein said inside diameter of said cap member is smaller than a diameter of said ball check valve.

* * * * *

UNITED STATES PATENT AND TRADEMARK OFFICE
CERTIFICATE OF CORRECTION

PATENT NO. : 4,544,053
DATED : OCTOBER 1, 1985
INVENTOR(S) : HIROJI YAMAGUCHI ET AL

It is certified that error appears in the above-identified patent and that said Letters Patent is hereby corrected as shown below:

```
Column 3, line 1, delete "calking" and insert --caulking--.
Column 4, line 51, change "dimeter" to --diameter--.
Column 6, line 62, change "accoding" to --according--.
```

Signed and Sealed this

Fourth Day of March 1986

[SEAL]

Attest:

*Attesting Officer*

DONALD J. QUIGG

*Commissioner of Patents and Trademarks*